US012064774B2

(12) United States Patent
Shin et al.

(10) Patent No.: US 12,064,774 B2
(45) Date of Patent: Aug. 20, 2024

(54) ELECTRIFICATION APPARATUS FOR ELECTRIC DUST COLLECTOR

(71) Applicant: LG Electronics Inc., Seoul (KR)

(72) Inventors: Namgyu Shin, Seoul (KR); Dong Hyuk Lee, Seoul (KR); Naehyun Park, Seoul (KR); Ah Ram Kim, Seoul (KR); Giseop Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 522 days.

(21) Appl. No.: 17/366,732

(22) Filed: Jul. 2, 2021

(65) Prior Publication Data

US 2022/0032322 A1 Feb. 3, 2022

(30) Foreign Application Priority Data

Jul. 30, 2020 (KR) ........................ 10-2020-0095185
Oct. 12, 2020 (KR) ........................ 10-2020-0131336
Feb. 10, 2021 (KR) ........................ 10-2021-0019064

(51) Int. Cl.
*B03C 3/47* (2006.01)
*B03C 3/08* (2006.01)
(Continued)

(52) U.S. Cl.
CPC .................. *B03C 3/47* (2013.01); *B03C 3/08* (2013.01); *B03C 3/38* (2013.01); *B03C 3/82* (2013.01);
(Continued)

(58) Field of Classification Search
CPC ......... B03C 3/38; B03C 3/82; B03C 2201/06; B03C 3/12; B03C 2201/10; B03C 2201/28; B03C 3/41; B03C 3/60; B03C 3/86
See application file for complete search history.

(56) References Cited

U.S. PATENT DOCUMENTS 5,009,683 A * 4/1991 Sun ....................... F24F 1/0353 361/231
5,322,550 A * 6/1994 Park .......................... B03C 3/41 96/97
(Continued)

FOREIGN PATENT DOCUMENTS

CN 2281843 Y * 5/1998
CN 102357415 A * 2/2012
(Continued)

OTHER PUBLICATIONS

Office Action in Korean Appln. No. 10-2021-0019064, dated Jun. 29, 2022, 12 pages (with English translation).
(Continued)

*Primary Examiner* — Christopher P Jones
*Assistant Examiner* — Sonji Turner
(74) *Attorney, Agent, or Firm* — Fish & Richardson P.C.

(57) ABSTRACT

An electrification apparatus for dust collection includes an electrification module configured to generate ions that are emitted to air. The electrification module comprises: a high voltage tip comprising at least one discharge tip configured to emit the ions in a direction opposite to a flow direction of the air, a conductive plate disposed around the discharge tip and configured to generate an electric potential difference with the discharge tip of the high voltage tip, a lower frame that mounts the conductive plate and the high voltage tip, and an upper frame that is coupled to the lower frame and that covers the conductive plate and the high voltage tip so that the discharge tip is exposed to outward.

19 Claims, 13 Drawing Sheets

(51) Int. Cl.
*B03C 3/38* (2006.01)
*B03C 3/82* (2006.01)

(52) U.S. Cl.
CPC ...... *B03C 2201/06* (2013.01); *B03C 2201/30* (2013.01)

(56) References Cited

U.S. PATENT DOCUMENTS

| | | | | | |
|---|---|---|---|---|---|
| 6,126,727 | A * | 10/2000 | Lo | H01T 23/00 96/97 |
| 7,332,019 | B2 * | 2/2008 | Bias | B03C 3/72 96/26 |
| 7,351,274 | B2 * | 4/2008 | Helt | B03C 3/12 96/26 |
| 7,601,204 | B2 * | 10/2009 | Woodruff | B03C 3/017 96/81 |
| 7,655,076 | B2 * | 2/2010 | Griffiths | B03C 3/011 96/64 |
| 10,414,247 | B2 * | 9/2019 | Jee | B60H 3/0078 |
| 2006/0130658 | A1 * | 6/2006 | Chang | B03C 3/12 96/97 |
| 2017/0341489 | A1 * | 11/2017 | Jee | B03C 3/41 |
| 2020/0023378 | A1 | 1/2020 | Shim et al. | |
| 2020/0023716 | A1 | 1/2020 | Shin et al. | |
| 2020/0206670 | A1 * | 7/2020 | Park | B03C 3/155 |
| 2022/0032321 | A1 * | 2/2022 | Shin | B03C 3/86 |

FOREIGN PATENT DOCUMENTS

| | | | | |
|---|---|---|---|---|
| CN | 108787167 | | 11/2018 | |
| CN | 110732410 | | 1/2020 | |
| CN | 110732411 | | 1/2020 | |
| EP | 3552710 | A1 * | 10/2019 | B03C 3/06 |
| JP | 2001276649 | | 10/2001 | |
| KR | 20160101408 | A * | 8/2016 | |
| KR | 10-2020-0009889 | | 1/2020 | |
| KR | 20200081672 | | 7/2020 | |

OTHER PUBLICATIONS

Office Action in Chinese Appln. No. 202110641661.2, mailed on May 6, 2023, 20 pages (with English translation).

* cited by examiner

ELECTRIFICATION APPARATUS FOR ELECTRIC DUST COLLECTOR

CROSS-REFERENCE TO RELATED APPLICATIONS

This application claims priority to and the benefit of Korean Patent Application No. 10-2020-0095185, filed on Jul. 30, 2020, Korean Patent Application No. 10-2020-0131336, filed on Oct. 12, 2020, and Korean Patent Application No. 10-2021-0019064, filed on Feb. 10, 2021, the disclosures of which are incorporated herein by reference in their entirety.

TECHNICAL FIELD

Disclosed herein is an electrification apparatus for an electric dust collector, and more specifically, an electrification apparatus for an electric dust collector that helps improve particle removal efficiency in a duct and a limited flow space and has a stable structure.

BACKGROUND

A method of removing particles generally involves two types of processes including electrification and dust collection. In the processes, dust particles are electrified, and the electrified dust particles are collected using a dust collecting filter.

A method of collecting dust includes collecting dust physically with nonwoven fabric, collecting dust electrically with a dielectric filter, and applying electrostatic force to a filter for physically collecting dust with an electrostatic nonwoven fabric.

An electrification method includes diffusion-based electrification, electric field-based electrification and hybrid electrification (diffusion and electric field-based electrification).

Electric field-based electrification applied to hybrid electrification is effective in collecting large particles, and diffusion-based electrification is effective in collecting small particles.

In relation to this, a structure for fixing a conductive microfiber and a cable to an installation frame disposed in a main body frame and supporting the same is disclosed in Korean Patent Publication No. 10-2020-0009889.

In a configuration disclosed in the prior art document, an installation opening, into which a conductive microfiber and a cable are inserted, is formed on any one of both lateral surfaces of the installation frame, and through the installation opening, the conductive microfiber and the cable are inserted in a horizontal direction and press-fitted into and coupled to the installation frame.

In the electrification apparatus for an electric dust collector according to the prior art document, one lateral surface of the installation frame is at least partially opened to form the installation opening, and the microfiber and the cable are press-fitted and coupled in the horizontal direction. When excessive force is applied to the microfiber and the cable during the coupling process, the installation frame is highly likely to be damaged. That is, the conductive microfiber is fixed at a position spaced a predetermined distance apart from both fixed ends of the installation frame having a bar shape, and press-fitting coupling force is applied in a direction vertical to a direction in which the installation frame extends. Accordingly, even when quite small magnitude of coupling force acts, the installation frame is inevitably damaged.

In the electrification apparatus for an electric dust collector according to the prior art document, one lateral surface of the installation frame is at least partially opened to form the installation opening. Accordingly, rigidity of the installation frame itself remarkably decreases, the installation frame is easily broken or damaged by quite small magnitude of external force during operation of the electrification apparatus, and the conductive microfiber is highly likely to escape from a predetermined position. As a result, electrification efficiency and discharge efficiency of the conductive microfiber greatly decreases.

SUMMARY

Technical Problem

The present disclosure is directed to an electrification apparatus for an electric dust collector in which a discharge tip may be installed on a frame through an additional tip holder supporting the discharge tip and a high voltage cable to prevent an escape of the discharge tip caused by vibration or external force, thereby ensuring improvement in electrification efficiency and discharge efficiency.

The present disclosure is also directed to an electrification apparatus for an electric dust collector in which electrification may continue to occur using the discharge tip and a ground electrode, and the discharge tip may be spaced a predetermined distance apart from the ground to maintain discharge, thereby preventing a reduction in discharge current as much as possible.

Aspects according to the present disclosure are not limited to the above ones, and other aspects and advantages that are not mentioned above can be clearly understood from the following description and can be more clearly understood from the embodiments set forth herein. Additionally, the aspects and advantages of the present disclosure can be realized via means and combinations thereof that are described in the appended claims.

Technical Solution

According to the present disclosure, provided is a structure in which an upper frame may be coupled to a lower frame to cover the lower frame onto which a conductive plate part and a high voltage tip part are mounted, thereby ensuring durability and reliability.

According to the present disclosure, provided is a coupling structure in which a discharge tip may be exposed outward and the high voltage tip part with fixed the discharge tip may be easily mounted.

According to the present disclosure, provided is a coupling structure in which a high voltage cable may be connected and coupled to a plurality of discharge tips without being exposed outward.

Advantageous Effect

In the electrification apparatus for an electric dust collector according to the present disclosure, a discharge tip may be firmly supported through a tip holder, thereby ensuring improvement in electrification efficiency and discharge efficiency.

In the electrification apparatus for an electric dust collector according to the present disclosure, rigidity of a frame may improve through a tip holder, thereby maintaining strength of the frame at a predetermined level or above in spite of a reduction in the electrification apparatus.

In the electrification apparatus for an electric dust collector according to the present disclosure, a space, in which a high voltage cable is installed, may be minimized using a cable holder supporting the high voltage cable, thereby reducing manufacturing costs.

Specific effects are described along with the above-described effects in the section of detailed description.

BRIEF DESCRIPTION OF DRAWING

The accompanying drawings constitute a part of the specification, illustrate one or more embodiments in the disclosure, and together with the specification, explain the disclosure, wherein.

DETAILED DESCRIPTION

Figure 1:
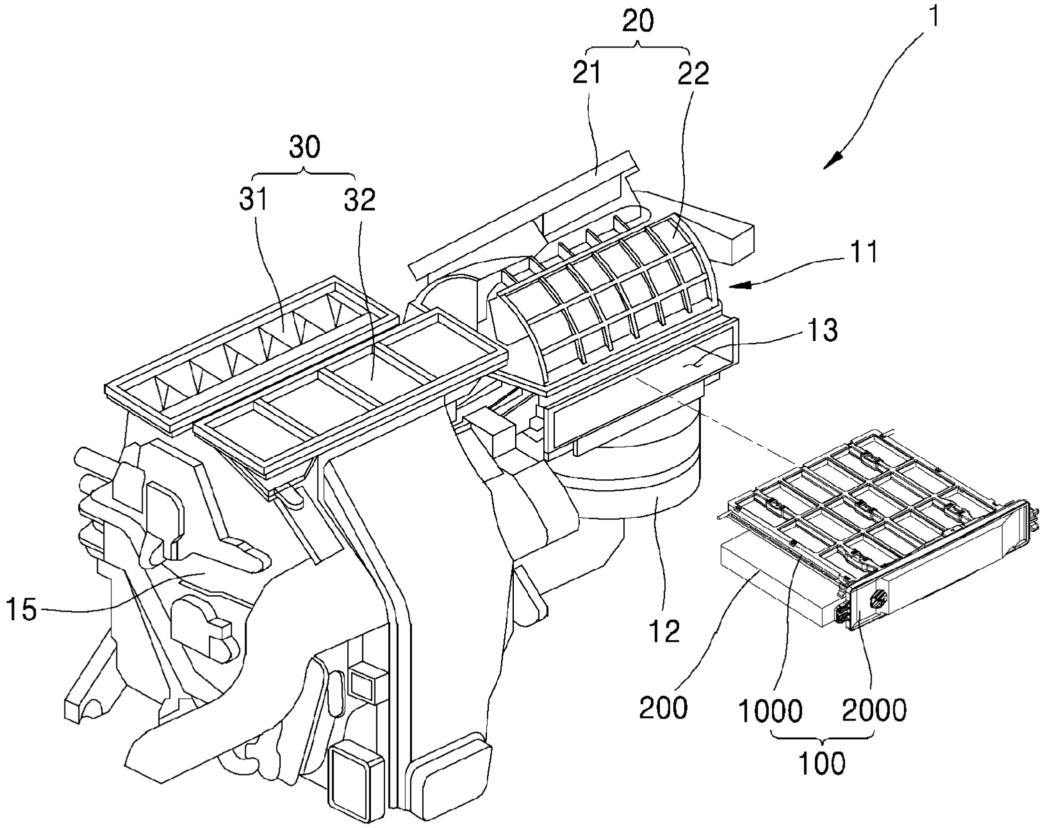
FIG. 1 is a perspective view schematically showing a vehicle air conditioner provided with an electrification apparatus for an electric dust collector according to one embodiment.

The above-described aspects, features and advantages are specifically described hereunder with reference to the accompanying drawings such that one having ordinary skill in the art to which the present disclosure pertains can easily implement the technical spirit of the disclosure. In the disclosure, detailed description of known technologies in relation to the disclosure is omitted if it is deemed to make the gist of the disclosure unnecessarily vague. Below, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components should not be limited by the terms. Certainly, a first component can be a second component unless stated to the contrary.

Throughout the disclosure, each component can be provided as a single one or a plurality of ones, unless explicitly stated to the contrary.

When one component is described as being "in an upper portion (or a lower portion)" of another component, or "on (or under)" another component, one component can be placed on the upper surface (or under the lower surface) of another component, and an additional component may be interposed between another component and one component on (or under) another component.

When one component is described as being "connected", "coupled", or "connected" to another component, one component can be directly connected, coupled or connected to another component. However, it is also to be understood that an additional component can be "interposed" between the two components, or the two components can be "connected", "coupled", or "connected" through an additional component.

The singular forms "a", "an" and "the" are intended to include the plural forms as well, unless explicitly indicated otherwise. It should be further understood that the terms "comprise" or "have" and the like, set forth herein, are not interpreted as necessarily including all the stated components or steps but can be interpreted as excluding some of the stated components or steps or can be interpreted as further including additional components or steps.

Throughout the disclosure, the terms "A and/or B" as used herein can denote A, B or A and B, and the terms "C to D" can denote C or greater and D or less, unless stated to the contrary.

Below, an electrification apparatus for an electric dust collector 100 according to embodiments is described with reference to the accompanying drawings.

An entire structure of an assembly constituting the electrification apparatus for an electric dust collector 100 and a vehicle air conditioner 1 according to one embodiment is briefly described with reference to FIGS. 1 to 3, and a structure of each assembly is briefly described.

FIG. 1 is a perspective view showing an electrification apparatus for an electric dust collector 100 according to one embodiment, and a vehicle air conditioner 1 in which the electrification apparatus for an electric dust collector 100 is installed.

As illustrated in FIG. 1, the electrification apparatus for an electric dust collector 100 according to one embodiment may be installed in the vehicle air conditioner 1.

However, a position of the electrification apparatus for an electric dust collector may not be limited, and the electrification apparatus for an electric dust collector may be applied to various types of air conditioners used in buildings and at homes, an air purifier and the like. Below, an electrification apparatus for an electric dust collector 100 installed in a vehicle air conditioner 1 is described as an example.

The vehicle air conditioner 1 may include a main body 11, 15 forming an exterior. The main body may include a suction main body 11 at which an inlet 20 is formed, and a discharge main body 15 at which an outlet 30 is formed.

The suction main body 11 and the discharge main body 15 may communicate with each other to allow air to flow.

A plurality of inlets 20 and a plurality of outlets 30 may be respectively formed at the suction main body 11 and the discharge main body 15.

The inlet 20 may include an indoor inlet 21 and an outdoor inlet 22. The indoor inlet 21 may be an entrance through which air in a vehicle provided with the vehicle air conditioner 1 flows into the main body 11. The outdoor inlet 22 may be an entrance through which air outside the vehicle flows into the main body 11.

The outlet 30 may include a front outlet 31 and a defrost outlet 32. The front outlet 31 may be an exit through which air discharged from the main body 11 flows into the vehicle.

The defrost outlet 32 may be an exit through which air discharged from the main body 11 flows to a window of the vehicle.

Additionally, the vehicle air conditioner 1 may include a fan (not illustrated), a heat exchanger (not illustrated) and the like installed in the main body 11, 15.

The vehicle air conditioner 1 may further include a damper (not illustrated) that selectively opens the plurality of inlets 20 and the plurality of outlets 30. For example, the damper may open any one of the indoor inlet 21 and the outdoor inlet 22 and close the other.

Additionally, the damper may open at least one of the plurality of outlets 30.

The vehicle air conditioner 1 may be provided with an electrification apparatus for an electric dust collector 1000 and a collection apparatus 2000.

The electrification apparatus for an electric dust collector 1000 may electrify foreign substances such as dust particles and the like in air. Additionally, the collection apparatus 2000 may collect the dust particles and the like electrified by the electrification apparatus for an electric dust collector 1000 and remove the dust particles and the like from the air.

The electrification apparatus for an electric dust collector 1000 may include an electrification module provided with a high voltage tip part and a conductive plate part described below.

The high voltage tip may be supplied with a high voltage, and the conductive plate part may be supplied with a ground electrode. Accordingly, the electrification apparatus for an electric dust collector 1000 may generate ions in the air and form an electric field.

In this case, the conductive plate part may form an electric field as a result of generation of an electric potential difference between the conductive plate part and the high voltage tip. A detailed configuration of the electrification apparatus for an electric dust collector is described below with reference to FIG. 2 and its following drawings.

The collection apparatus 2000 may be a sort of filter that collects particles electrified by the electrification apparatus for an electric dust collector 100 and may be made of various materials.

For example, the collection apparatus 2000 may be implemented as a porous fiber filter such as non-woven fabric and the like. Additionally, a conductive material may be applied, coated or attached to a surface of the collection apparatus 2000.

Based on the above feature, dust particles and the like in air passing through the electrification apparatus for an electric dust collector 1000 may combine with ions generated by the electrification apparatus for an electric dust collector 1000 and may be electrified. Then the electrified dust particles and the like may be collected in the electrification apparatus for an electric dust collector 1000 or the collection apparatus 2000.

The electrification apparatus for an electric dust collector 1000 according to one embodiment may be provided as an individual apparatus in addition to the collection apparatus 2000.

Specifically, the electrification apparatus for an electric dust collector 1000 and the collection apparatus 2000 may be manufactured and distributed through different manufacturing and distribution processes. Alternatively, the electrification apparatus for an electric dust collector 1000 and the collection apparatus 2000 may be coupled to each other by an additional coupling member and the like and may be mounted onto the vehicle air conditioner 1.

The vehicle air conditioner 1, as illustrated in FIG. 1, may be provided with a dust collector installing part 13 in which the electrification apparatus for an electric dust collector 1000 and the collection apparatus 2000 are installed. Specifically, the dust collector installing part 13 may be formed near the inlet 20 at the suction main body 11.

The dust collector installing part 13 may be disposed below current of air with respect to a direction in which the air introduced through the inlet 20 flows. Accordingly, the air introduced through the inlet 20 passes through the electrification apparatus for an electric dust collector 100 before passing through the collection apparatus 200.

Additionally, the vehicle air conditioner 1 may be provided with a fan installing part 12 in which a fan is installed. Specifically, the fan installing part 12 may be formed near the inlet 20 at the suction main body 11. The fan installing part 12 may be disposed below the dust collector installing part 13 with respect to the flow direction of air.

That is, the inlet 20, the dust collector installing part 13 and the fan installing part 12 may be consecutively disposed at the suction main body 11 in the flow direction of air. Accordingly, the air introduced through the inlet 20 may pass through the electrification apparatus for an electric dust collector 1000, the collection apparatus 2000 and the fan consecutively and may flow to the discharge main body 15.

In this case, the electrification apparatus for an electric dust collector 1000 and the collection apparatus 2000 may be respectively installed in the dust collector installing part 13. In particular, the collection apparatus 2000 may be disposed further downward than the electrification apparatus for an electric dust collector 1000 with respect to the flow direction of air. Thus, the air introduced through the inlet 20 may pass through the electrification apparatus for an electric dust collector 1000 and the collection apparatus 2000 consecutively to flow.

The electrification apparatus for an electric dust collector 1000 may be installed in the dust collector installing part 13 in a state of being mounted onto the collection apparatus 2000. That is, the electrification apparatus for an electric dust collector 1000 and the collection apparatus 2000 may be mounted onto the dust collector installing part 13 in a way that the electrification apparatus for an electric dust collector and the collection apparatus overlap, as illustrated.

Since the electrification apparatus for an electric dust collector 1000 and the collection apparatus 2000 are installed individually and respectively as described above, the electrification apparatus for an electric dust collector and the collection apparatus may be respectively managed. For example, a user may separate the collection apparatus 2000 from the vehicle air conditioner 1 and may replace and wash the collection apparatus.

A cycle by which the electrification apparatus for an electric dust collector 1000 is replaced, and a cycle by which the collection apparatus 2000 is replaced may differ. Since a larger amount of dust particles and the like are generally collected in the collection apparatus 2000, the cycle by which the collection apparatus 2000 is replaced may be shorter than the cycle by which the electrification apparatus for an electric dust collector is replaced. Thus, the user may replace the collection apparatus 2000 only with no need to replace the electrification apparatus for an electric dust collector 1000, thereby making it possible to ensure significant improvement in user convenience.

Figure 2:
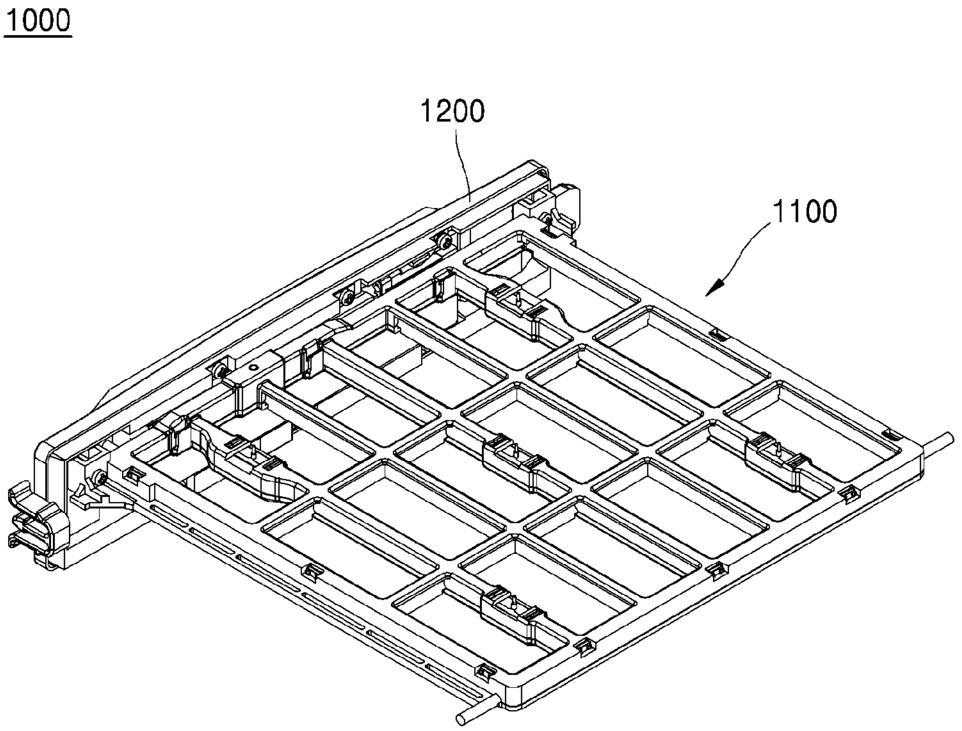
FIG. 2 is a block diagram schematically showing an electrification apparatus for an electric dust collector according to one embodiment.
Figure 3:
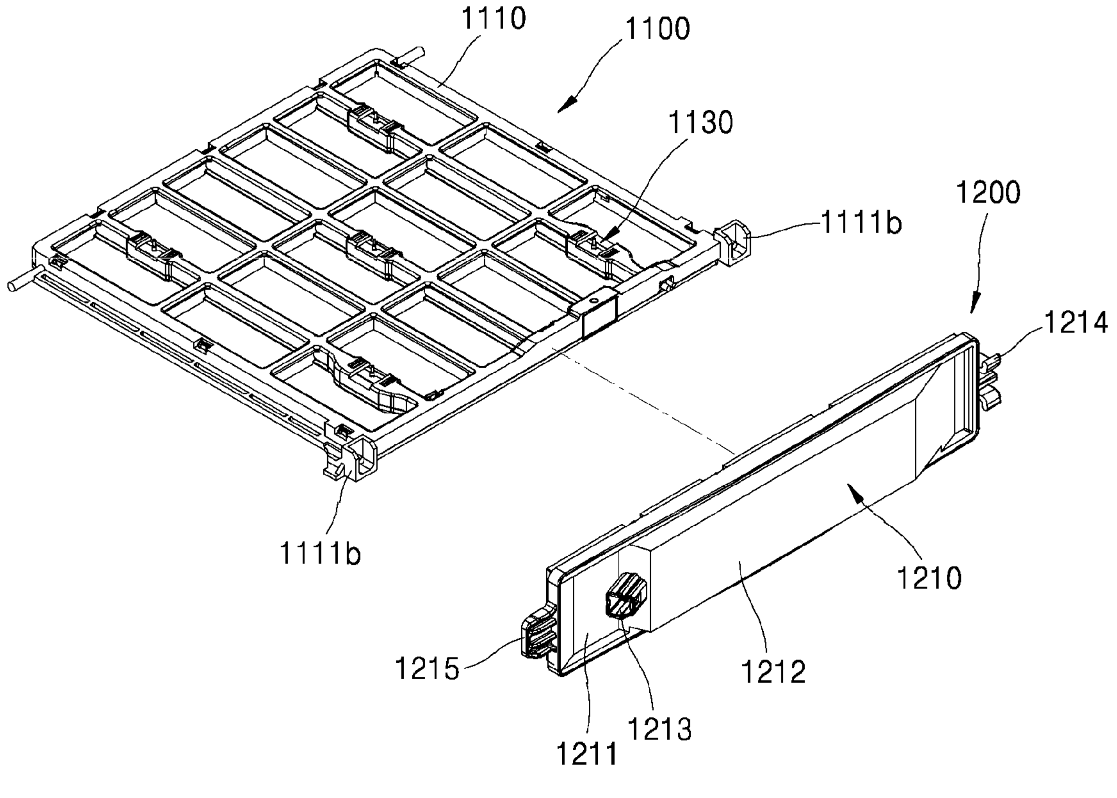
FIG. 3 is an exploded block diagram schematically showing the electrification apparatus for an electric dust collector in FIG. 2.

FIG. 2 is a block diagram schematically showing an electrification apparatus for an electric dust collector according to one embodiment, and FIG. 3 is an exploded block diagram schematically showing the electrification apparatus for an electric dust collector in FIG. 2.

FIG. 3 is an exploded perspective view showing an electrification module 1100 and a cover module 1200 separated from each other in the electrification apparatus for an electric dust collector 1000.

Specifically, the electrification apparatus for an electric dust collector 1000 according to one embodiment may include an electrification module 1100 that electrifies foreign substances such as a dust particle and the like included in air passing through the electrification apparatus for an electric dust collector, and a cover module 1200 that supplies a high voltage to the electrification module 1100.

The electrification module 1100 may be a part inserted into the dust collector installing part 13 and directly exposed to flowing air as a whole, and the cover module 1200 may be a part serving as a cap that is coupled to an open part of the dust collector installing part 13 into which the electrification module 1100 is inserted and that blocks the open part.

The cover module 1200 may include a cover part 1210 serving as a cap, and a high voltage supplier (not illustrated) present in the cover part 1210 and generating a high voltage to be supplied to the electrification module 1100. A high voltage cable for supplying a voltage to a discharge tip 1131 of the high voltage tip part 1130, and a ground cable for grounding a conductive plate part described below may electrically connect to the high voltage supplier (not illustrated).

A protruding surface 1212 that at least partially protrudes forward may be formed on a front surface 1211 of the cover part 1210. A space, in which the high voltage supplier is accommodated, may be formed at a rear of the protruding surface 1212.

The cover part 1210 may be provided integrally or separately with a main connector 1213 for allowing external power to be supplied to the high voltage supplier, on the front surface 1211 thereof.

Additionally, the cover module 1200 may be provided with a hook-shaped retainer 1214 and a holding projection 1215 for a detachable coupling to the dust collector installing part 13, on sides thereof.

The electrification module 1100 and the cover module 1200 may be detachably coupled to each other through a bolt. Specifically, a connecting part **1111*b* formed at an upper frame 1110 of the electrification module 1100 may be coupled to the cover part 1210 through the bolt in a state of being coupled to a rear surface of the cover part 1210**.

Though not illustrated, a mesh (not illustrated) having a plate shape may be disposed in a below of the electrification module 1100, and may collect electrified dust particles at least partially.

A technical configuration and an organic coupling structure of an electrification module according to one embodiment are specifically described hereunder with reference to FIGS. 4 to 14.

Figure 4:
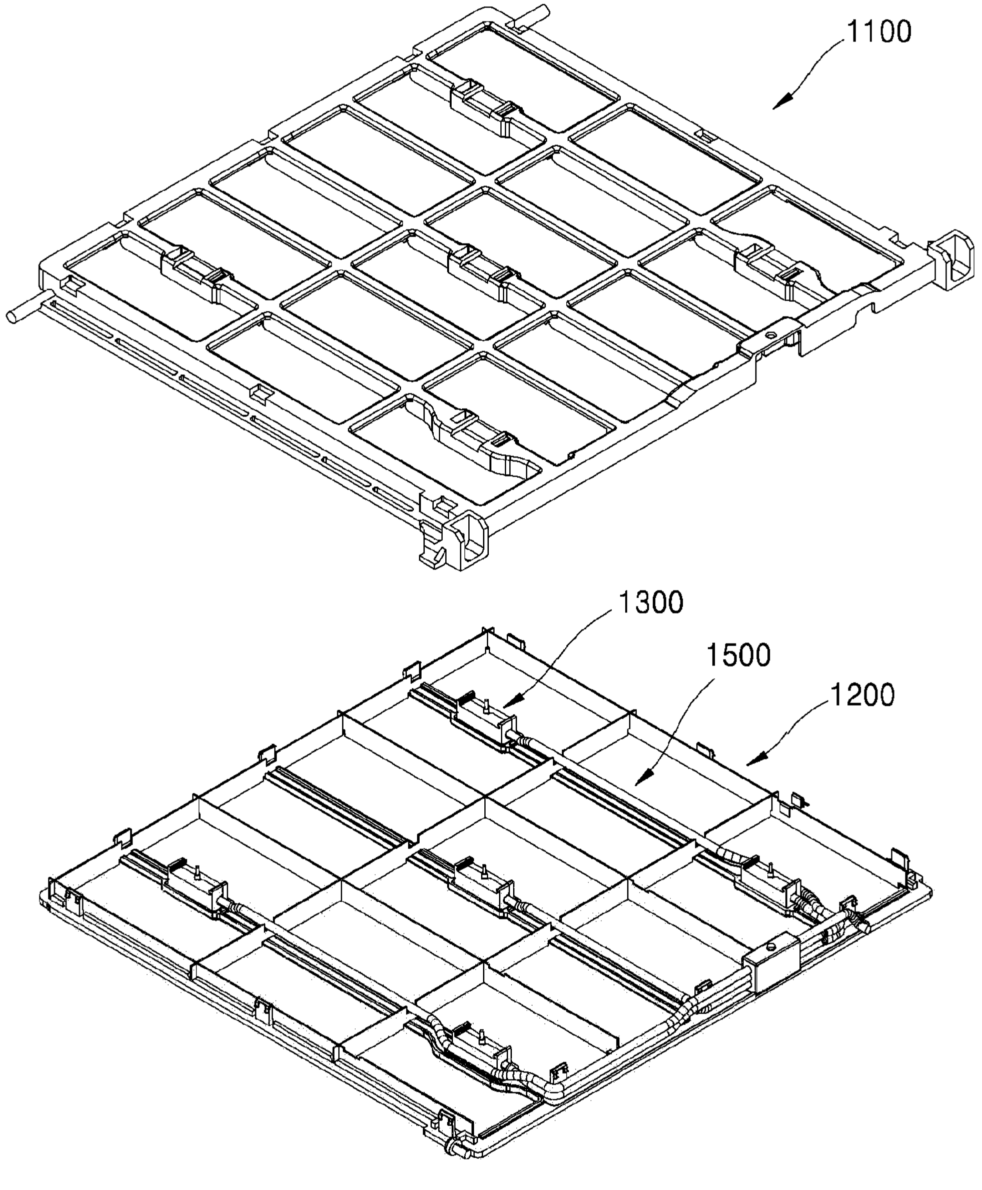
FIG. 4 is a first exploded block diagram schematically showing an electrification module in the electrification apparatus for an electric dust collector in FIG. 3.
Figure 5:
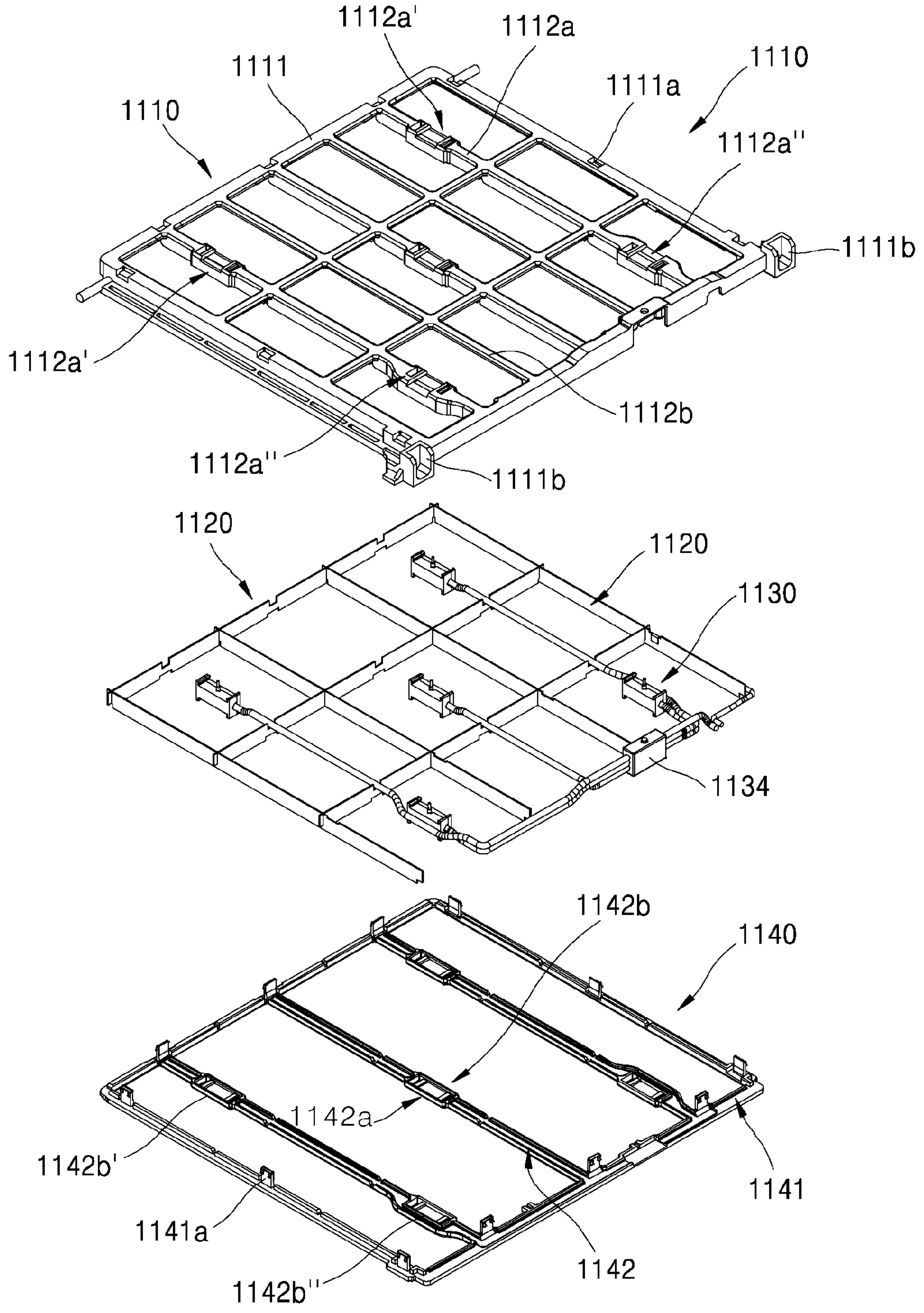
FIG. 5 is a second exploded block diagram schematically showing an electrification module in the electrification apparatus for an electric dust collector in FIG. 3.
Figure 6:
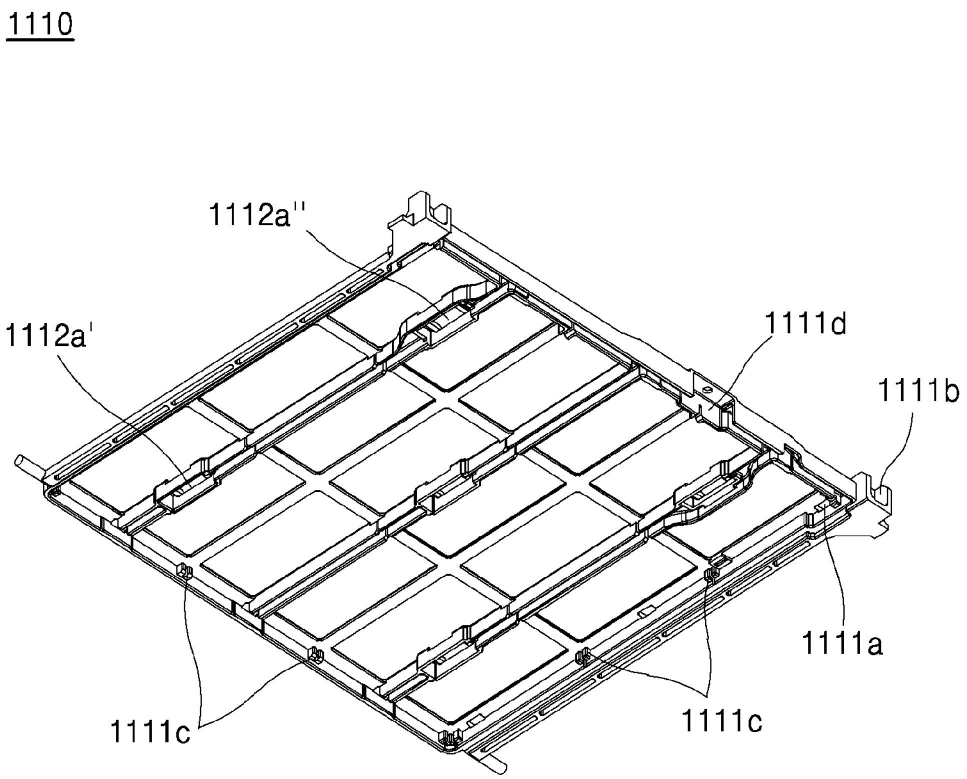
FIG. 6 is a bottom perspective view schematically showing an upper frame in the electrification module in FIG. 4.

FIG. 4 is a first exploded block diagram schematically showing an electrification module in the electrification apparatus for an electric dust collector in FIG. 3. FIG. 5 is a second exploded block diagram schematically showing an electrification module in the electrification apparatus for an electric dust collector in FIG. 3. FIG. 6 is a bottom perspective view schematically showing an upper frame in the electrification module in FIG. 4.

Specifically, the electrification module 1100 may include an upper frame 1110, a conductive plate part 1120, a high voltage tip part 1130, and a lower frame 1140.

FIG. 4 is an exploded block diagram in which the upper frame 1110 is only separated, and FIG. 5 is an exploded block diagram in which the conductive plate part 1120 and the lower frame 1140 are additionally separated.

The conductive plate part 1120, the high voltage tip part 1130 and the upper frame 1110 may be consecutively stacked on the lower frame 1140.

That is, the conductive plate part 1120 and the high voltage tip part 1130 may be mounted onto and supported by the lower frame 1140, and the upper frame 1110 may be detachably coupled to the lower frame 1140 while covering the conductive plate part 1120 and the high voltage tip part 1130 such that the discharge tip is exposed outward.

The upper frame 1110 may include an upper outer frame 1111, and an upper inner frame 1112.

The upper outer frame 1111 may correspond to an outer part, and may have a predetermined height and a rectangle shape as a whole.

The upper outer frame 1111 may have a cross section, a lower end of which is open and which has a "U" shape entirely. Additionally, of the conductive plate part 1120, a conductive plate disposed on an outer side may be accommodated in a "U"-shaped inner space of the upper outer frame 1111.

Additionally, the high voltage cable 1132 and a cable holder 1134 of the high voltage tip part 1130 may be accommodated in an inner space of the upper outer frame 1111, in which the conductive plate part is not disposed.

A lower frame coupling part for a coupling with the lower frame 1140 may be formed at the upper outer frame 1111, and the lower frame coupling part may be implemented as a plurality of hook coupling parts **1111*a*. The hook coupling part 1111*a* may be used for detachably coupling the upper frame 1110 to the lower frame 1140, and may be formed to correspond to the coupling hook 1141*a* of the lower frame 1140**.

A conductive plate coupling part **1111*c* may be further formed at the upper outer frame 1111. The conductive plate coupling part 1111*c*** may be formed into a groove into which the conductive plate is inserted.

Additionally, a connecting part **1111*b* for a coupling with the cover module 1200 may be formed at the upper outer frame 1111**, as described above.

Further, a cable holder coupling part **1111*d* may be formed at the upper outer frame 1111, and the cable holder 1134 may cover the cable holder coupling part 1111*d* and may be coupled to the cable holder coupling part 1111*d***.

The upper inner frame 1112 may be formed inside the upper outer frame, and may include a first upper inner frame 1112*a* and a second upper inner frame 1112*b*. The first upper inner frame 1112*a* may be used to cover the high voltage tip part, and the second upper inner frame 1112*b* may be used to cover the conductive plate part.

The second upper inner frame 1112*b* may partition the inner space of the upper outer frame into a plurality of electrification spaces.

Like the upper outer frame 1111, the first upper inner frame 1112*a* and the second upper inner frame 1112*b* may have a cross section, a lower end of which is open and which has a "U" shape entirely.

FIG. 6 shows an example in which the first upper inner frame 1112*a* only has a U-shaped cross section.

The high voltage cable 1132 supplying a voltage to the discharge tip 1131 of the high voltage tip part 1130 may be accommodated in the inner space of the first upper inner frame 1112*a*.

An upper high voltage tip body coupling part 1112*a*', 1112*a*" may be formed at the first upper inner frame 1112*a*, and a high voltage tip body 1133 of the high voltage tip part 1130 may be coupled to the high voltage tip body coupling part 1112*a*', 1112*a*".

An open part (1112*a*'1 and 1112*a*"1 illustrated in FIG. 12) through which the discharge tip 1131 of the high voltage tip part 1300 passes, and a high voltage tip body upper coupling part (1112*a*'2 and 1112*a*"2 illustrated in FIG. 12) to which the high voltage tip body 1133 is coupled may be formed at the upper high voltage tip body coupling part 1112*a*', 1112*a*".

Additionally, the upper high voltage tip body coupling part may include a first upper high voltage tip body coupling part 1112*a*' and a second upper high voltage tip body coupling part 1112*a*".

The second upper high voltage tip body coupling part 1112*a*" may be disposed at a front of the first upper high voltage tip body coupling part 1112*a*' with respect to an extension direction of the high voltage cable 1132.

The high voltage tip body may be coupled to the first upper high voltage tip body coupling part 1112*a*', and the high voltage tip body may be coupled to the second upper high voltage tip body coupling part 1112*a*", and . . . may simultaneously cover the high voltage tip body and the high voltage cable 1132.

When a single first upper inner frame 1112*a* covers a plurality of high voltage tip body 1133, the second upper high voltage tip body coupling part 1112*a*", formed at the front of the first upper high voltage tip body coupling part 1112*a*' with respect to an extension direction of the high voltage cable 1132, may be formed to correspond to a surface area in which the high voltage tip body and the high voltage cable 1132 are disposed to simultaneously cover the high voltage tip body and the high voltage cable 1132.

The second upper inner frame 1112*b* may be disposed in a way that the second upper inner frame is parallel to the first upper inner frame 1112*a*, and may be disposed inside the upper outer frame 1111.

The lower frame 1140 may include a lower outer frame 1141 and a lower inner frame 1142.

The lower outer frame 1141 may be formed to correspond to the upper outer frame 1111, and a hook 1141*a* for allowing the lower outer frame 1141 to be inserted into and coupled to the hook coupling part 1111*a* of the upper outer frame may be formed to protrude upward.

A lower inner frame 1142 may be disposed inside the lower outer frame 1141, and a plurality of inner lower frames may be formed to correspond to a plurality of first upper inner frames 1112*a*.

A cable mounting groove 1142*a* and a lower high voltage tip body mounting part 1142*b* may be formed at the lower inner frame 1142.

The cable mounting groove 1142*a* may be used for mounting the high voltage cable 1132 of the high voltage tip part 1130, and the lower high voltage tip body mounting part 1142*b* may be used for mounting the high voltage tip body 1133 of the high voltage tip part 1130.

A first lower high voltage tip body mounting part 1142*b*' and a second lower high voltage tip body mounting part 1142*b*" may be formed at the lower high voltage tip body mounting part 1142*b*.

The high voltage tip body may be mounted onto the first lower high voltage tip body mounting part 1142*b*', and the high voltage tip body and the high voltage cable 1132 may be mounted onto the second lower high voltage tip body mounting part 1142*b*".

That is, when the plurality of high voltage tip bodies 1133 is mounted onto a single lower inner frame 1142, a cable mounting groove may be additionally formed at the second lower high voltage tip body mounting part 1142*b*" formed at a front of with respect to the extension direction of the high voltage cable 1132.

Accordingly, the high voltage cable may extend in a safe manner to the high voltage tip body disposed at a rear with respect to the extension direction of the high voltage cable 1132.

Thus, the upper frame 1110 and the lower frame 1140 according to one embodiment may form an exterior of the electrification module 1100, and may fix and support the high voltage tip part 1130 and the conductive plate part 1120 at a predetermined position.

To this end, the upper frame 1110 and the lower frame 1140 may be made of a non-conductive material, e.g., plastics. Additionally, the upper frame 1110 and the lower frame 1140 may be formed into various shapes through an injection process and the like.

Figure 7:
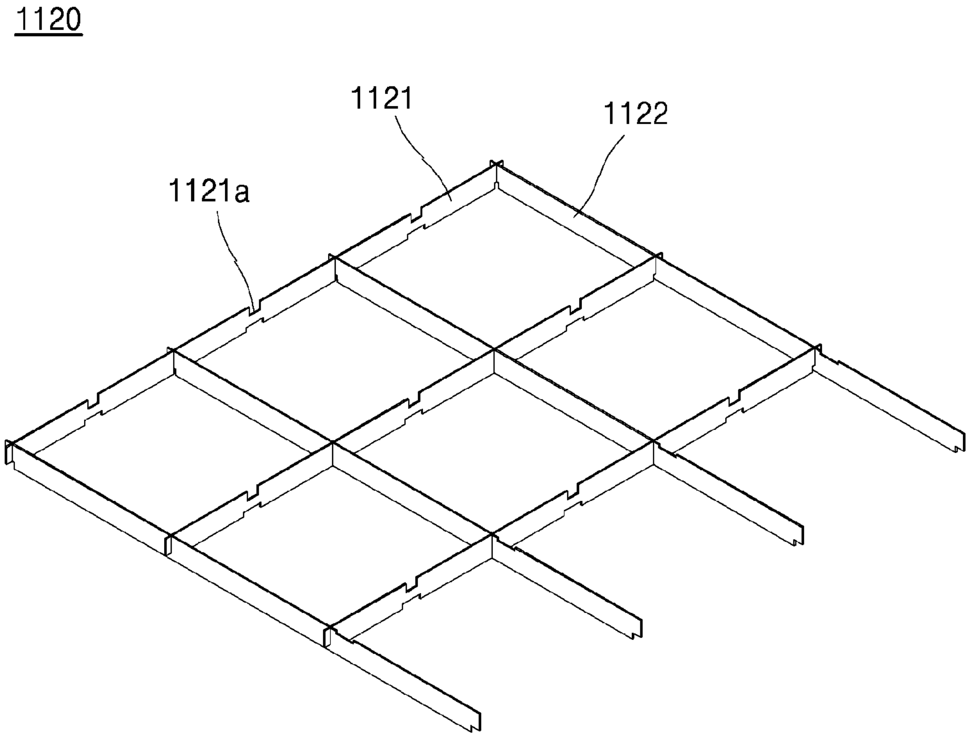
FIG. 7 is a block diagram schematically showing a conductive plate part in the electrification module in FIG. 4.
Figure 8:
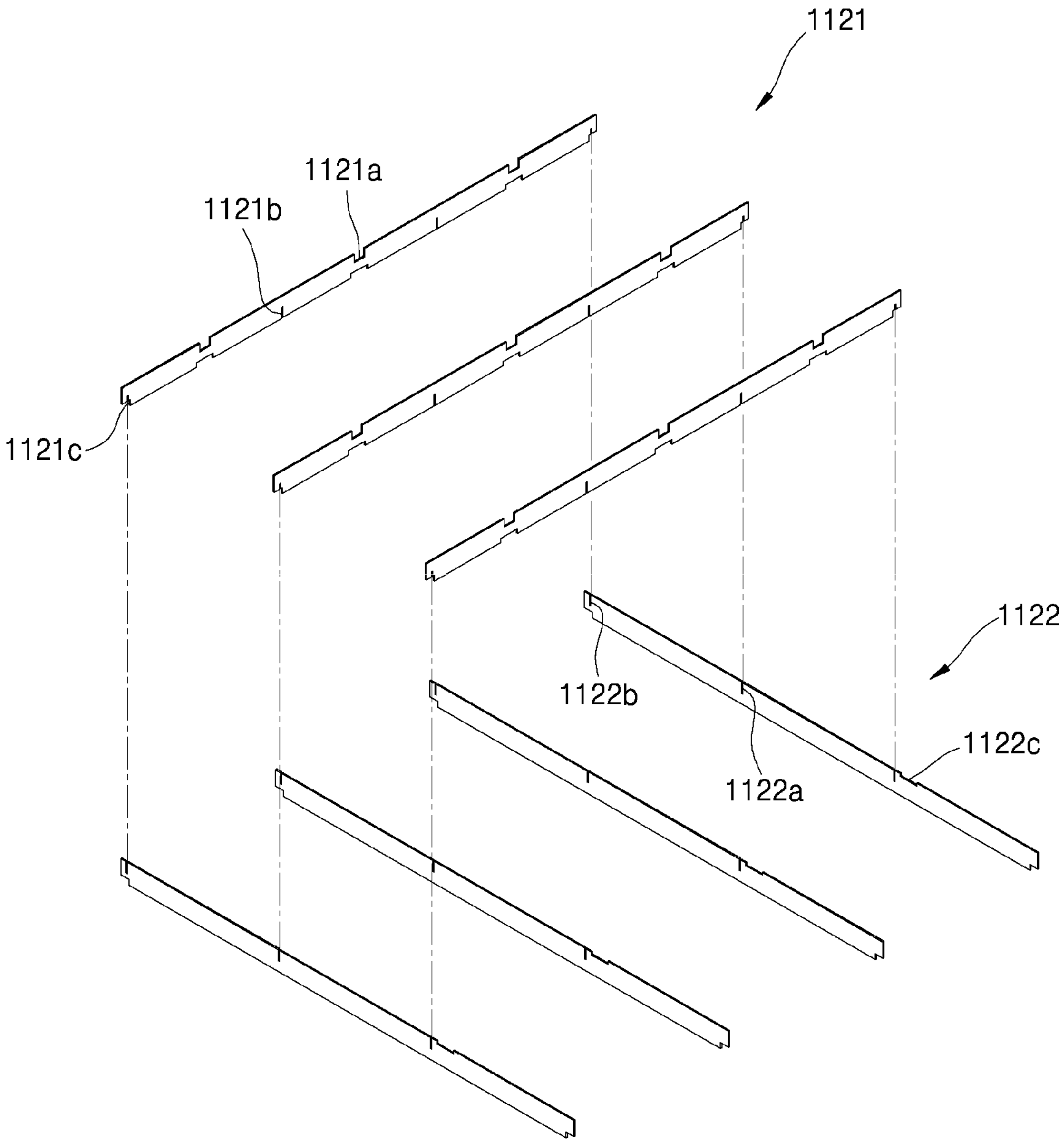
FIG. 8 is an exploded block diagram schematically showing the conductive plate part in FIG. 7.

FIG. 7 is a block diagram schematically showing a conductive plate part in the electrification module in FIG. 4. FIG. 8 is an exploded block diagram schematically showing the conductive plate part in FIG. 7.

As illustrated, the conductive plate part 1120 may form an electric field along with the high voltage tip part 1130. The conductive plate part 1120 may be implemented as a metallic plate having a predetermined thickness, and a ground cable 1135 for grounding may connect to the conductive plate part 1120. Accordingly, an electric potential difference may occur between the conductive plate part 1120 and the discharge tip 1131 of the high voltage tip part 1130, and an electric field may be formed therebetween.

Additionally, a high density of ions may be generated between the discharge tip 1131 and the conductive plate part 1120.

Since the conductive plate part 1120 may be provided as a flat plate having a predetermined width in a direction in which the discharge tips are stacked, the conductive plate part 1120 may collect predetermined dust particles and the like. The conductive plate part 1120 may be covered by the upper frame 1110 to prevent dust particles and the like from directly being fixed to the conductive plate part 1120.

The conductive plate part 1120 may be disposed around the discharge tip 1131. Specifically, the conductive plate part 1120 may form a predetermined electrification space encircling a perimeter of the discharge tip 1131. The electrification space may be blocked by the conductive plate part 1120 in a direction in which the conductive plate part encircles the perimeter the discharge tip 1131, and may be open in an upward direction of the discharge tip 1131.

Further, the conductive plate part 1120 may form an electrification space having a rectangular pillar shape. The electrification space may be formed into a square pillar to uniformize a magnetic field and ion emission, for example.

In this case, the discharge tip 1131 may be disposed at a center of the electrification space, and may be arranged to emit ions in a direction opposite to the flow direction of air.

The electrification space, as described above, may denote a space formed to encircle a single discharge tip 1131.

Accordingly, the number of the electrification spaces may correspond to the number of the discharge tips 1131.

In this embodiment, a total of nine electrification spaces are formed, for example. In this case, the discharge tip 1131 may be disposed respectively in each of the electrification spaces, or only in some of the electrification spaces.

In the illustrated embodiment, a total of five discharge tips 1131 is disposed, and the number of the discharge tips 1131 provided may be adjusted depending on a required ion emission amount or a required air flow rate. For convenience, a configuration in which a total of five discharge tips 1131 is arranged is described, hereunder.

The conductive plate part 1120 may include a plurality of first plates 1121 and a plurality of second plates 1122. The first plate 1121 and the second plate 1122 may be disposed to cross each other in an orthogonal direction.

The plurality of first plates 1121 and the plurality of second plates 1122 may be arranged at regular intervals, and the first plate 1121 may be inserted into and coupled to the second plate 1122 such that upper ends of the first plate 1121 and the second plate 1122 are disposed on the same flat surface.

A cable mounting part 1121*a*, a second plate inserting part 1121*b* and an end coupling part 1121*c* may be formed on the first plate 1121.

The cable mounting part 1121*a* may be used for mounting the high voltage cable 1132 of the high voltage tip part 1130. That is, the cable mounting part 1121*a* may be formed into a groove extending from the upper end of the first plate 1121, and as the high voltage cable 1132 supplying a voltage to the discharge tip 1131 is mounted onto the cable mounting part 1121*a* having a groove shape, the electrification module 1100 may have a stable structure that prevents movement of the high voltage cable 1132, caused by an external impact or pressure.

The second plate inserting part 1121*b* may be formed into a slit extending from a lower end surface of the first plate 1121 to an upper portion of the first plate.

The end coupling part 1121*c* may be formed at both lateral ends of the first plate 1121, and may be used for inserting and coupling the second plate 1122 to be coupled to both of the lateral ends of the first plate 1121. The end coupling part 1121*c* may be formed into a slit extending from a lower end surface of the first plate 1121 to an upper portion of the first plate.

A first plate inserting part 1122*a*, an end coupling part 1122*b*, and a ground pin mounting part 1122*c* may be formed on the second plate 1122.

The first plate inserting part 1122*a* may be formed into a slit extending from an upper end surface of the second plate 1122 to a lower portion of the second plate, and the first plate 1121 may be inserted into the second plate from an upward direction to a downward direction.

The end coupling part 1122*b* may be formed at both lateral ends of the second plate 1122, and may be formed into a slit extending from the upper end surface of the second plate 1122 to the lower portion of the second plate. The first plate 1121 may be inserted into the second plate from the upward direction to the downward direction.

A ground pin (indicated by 1136 in FIG. 9) connected to the ground cable 1135 may be inserted into and coupled to the ground pin mounting part 1122*c*.

With the above configuration, the conductive plate part 1120 may be portioned into individual electrification spaces by the first plate 1121 and the second plate 1122. FIG. 7 shows nine electrification spaces as an example.

The first plate 1121 and the second plate 1122 may be integrally formed or may be manufactured individually and respectively and coupled.

Figure 9:
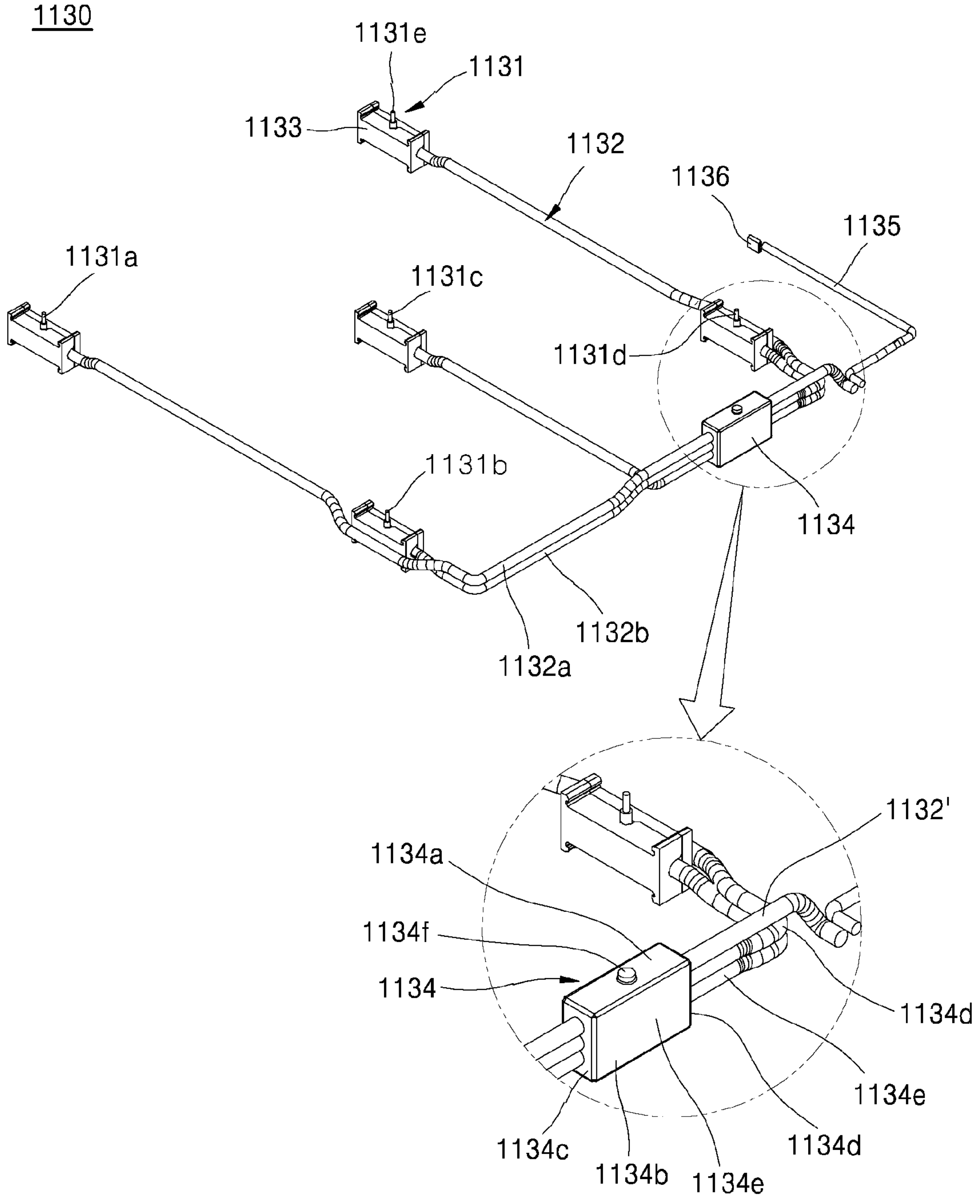
FIG. 9 is a block diagram schematically showing a high voltage tip part in the electrification module in FIG. 4.
Figure 10:
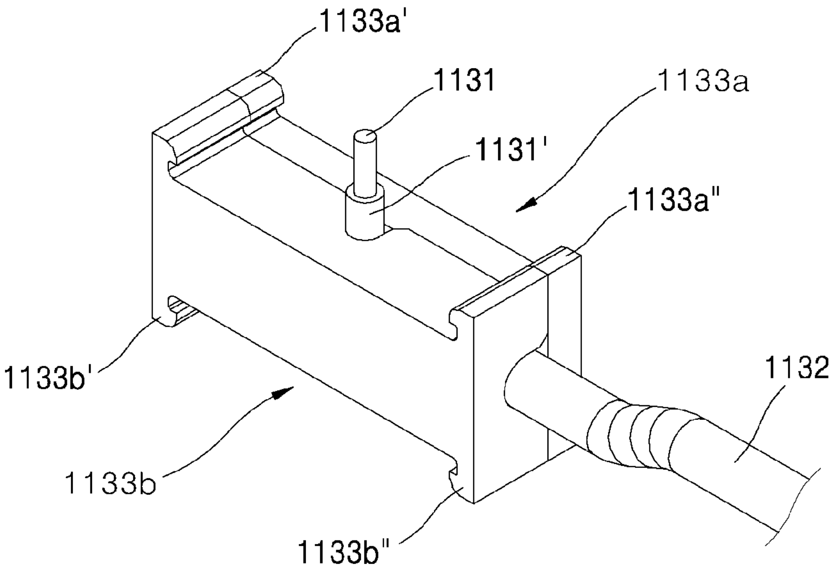
FIG. 10 is a detailed block diagram schematically showing the high voltage tip part in FIG. 9.
Figure 11:
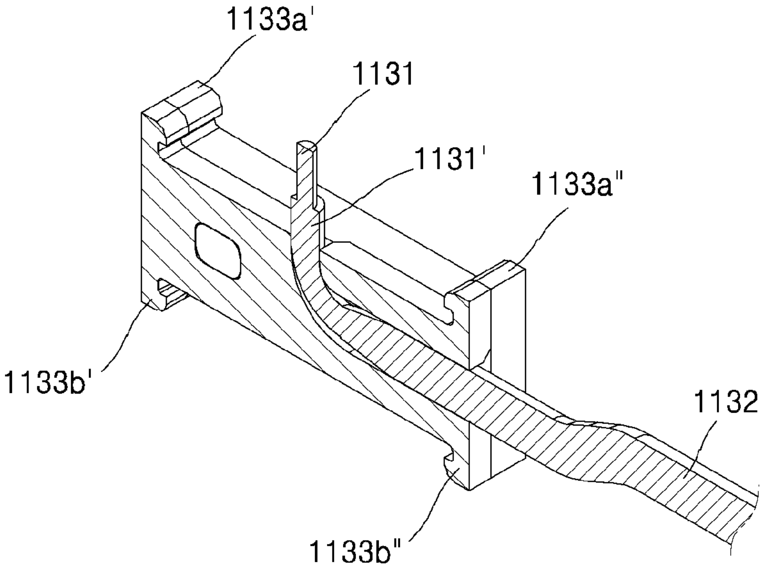
FIG. 11 is a cross-sectional view schematically showing the high voltage tip part in FIG. 9.
Figure 12A:
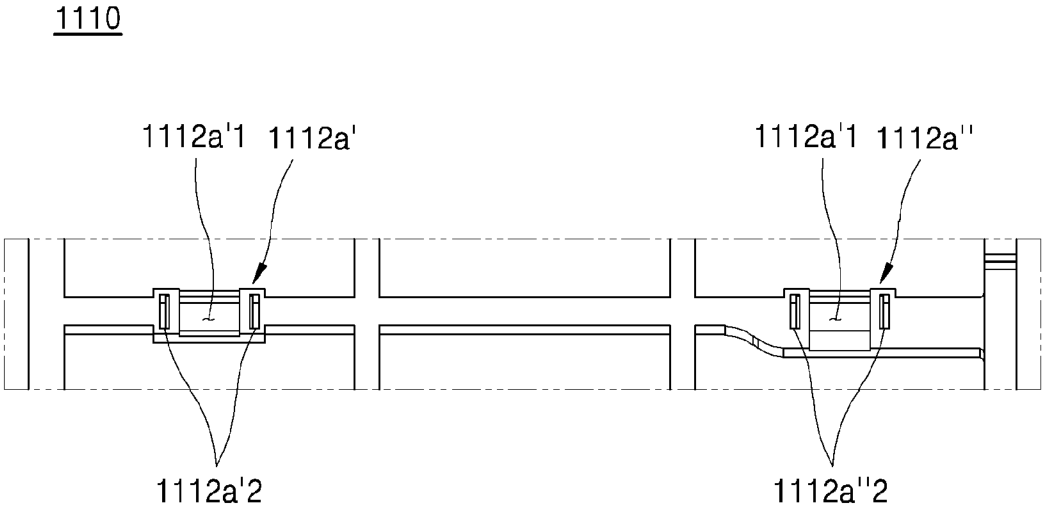
FIGS. 12*a* and 12*b* are partial block diagrams schematically showing an upper frame and a lower frame in the electrification module in FIG. 4.
Figure 12B:
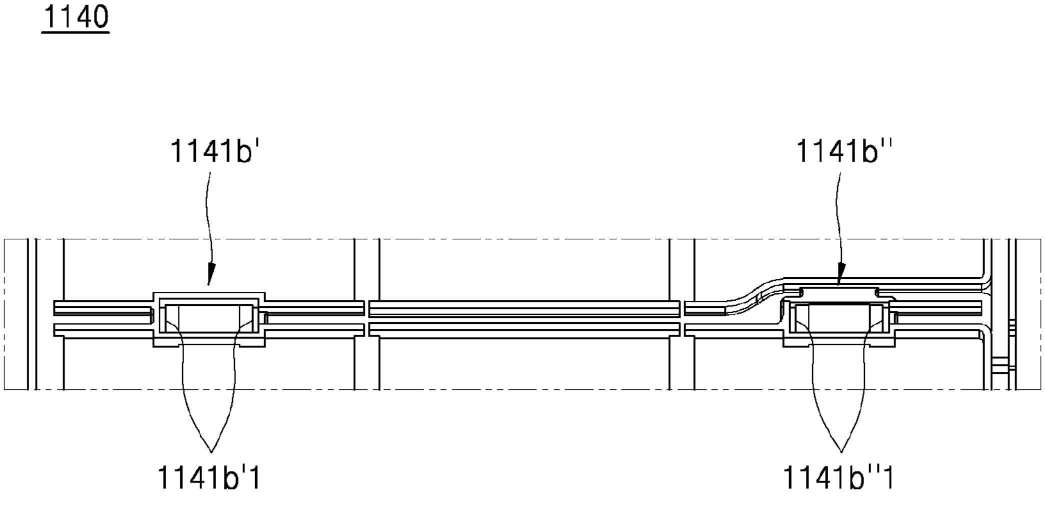
Figure 13:
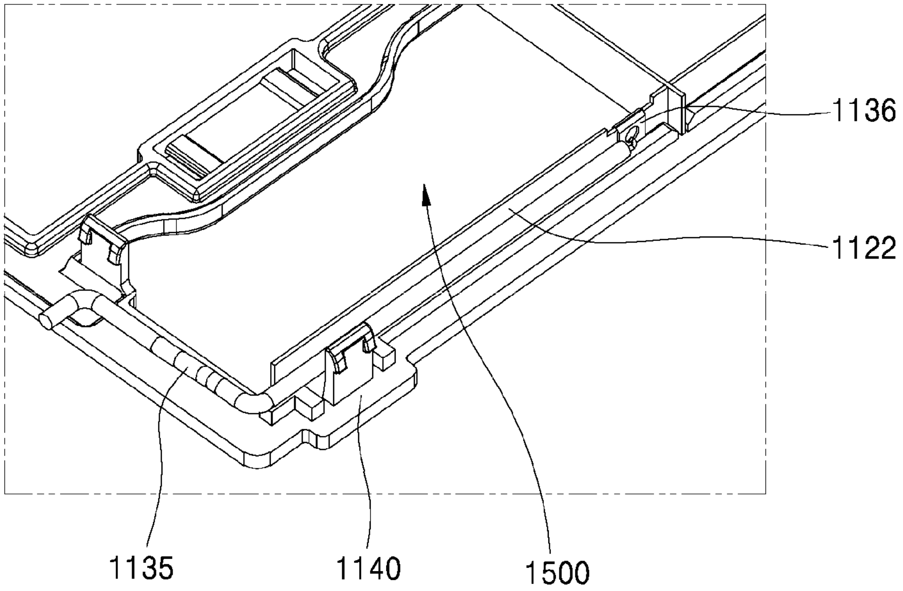
FIG. 13 is a block diagram schematically showing a state in which a ground cable of a high voltage tip part is coupled to a lower frame.
Figure 14:
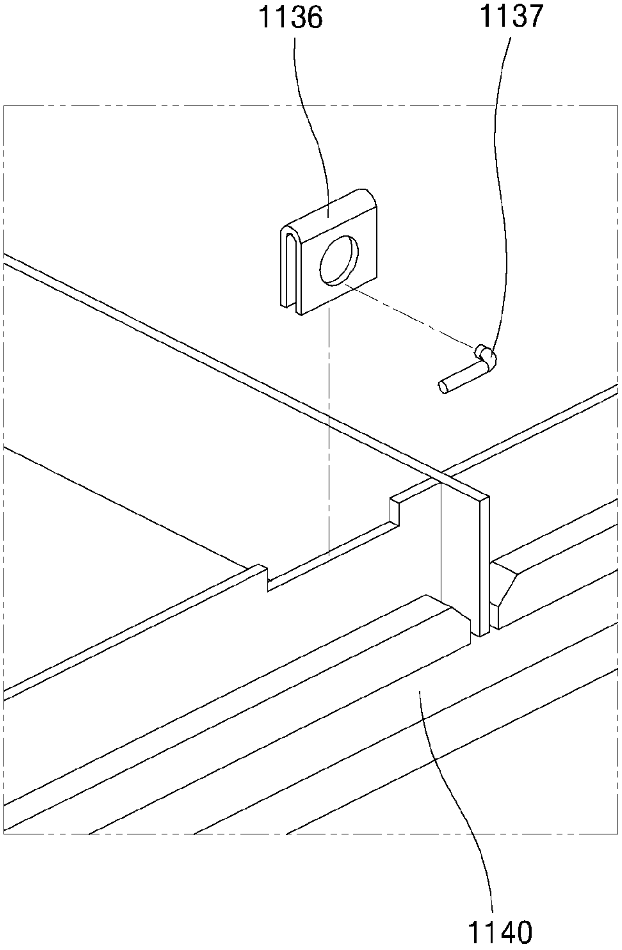
FIG. 14 is a partial block diagram schematically showing a coupling structure of a ground pin connected to the ground cable in FIG. 13.

FIG. 9 is a block diagram schematically showing a high voltage tip part in the electrification module in FIG. 4, FIG. 10 is a detailed block diagram schematically showing the high voltage tip part in FIG. 9, FIG. 11 is a cross-sectional view schematically showing the high voltage tip part in FIG. 9, FIGS. 12*a* and 12*b* are partial block diagrams schematically showing an upper frame and a lower frame in the electrification module in FIG. 4, FIG. 13 is a block diagram schematically showing a state in which a ground cable of a high voltage tip part is coupled to a lower frame, and FIG. 14 is a partial block diagram schematically showing a coupling structure of a ground pin connected to the ground cable in FIG. 13.

The high voltage tip part 1130, as illustrated, may include a discharge tip 1131, a high voltage cable 1132, a high voltage tip body 1133, a cable holder 1134, a ground cable 1135, a ground terminal 1136, and a ground connecting tip 1137.

The discharge tip 1131 may include a discharge brush directly causing a discharge. For example, the discharge brush may be made of a plurality of carbon fibers. The carbon fiber may be formed into microfiber having a diameter of micrometers. When a high voltage is supplied to the carbon fiber through the high voltage cable 1132, ions may be generated in the air by a corona discharge.

Additionally, the discharge tip 1131 may be arranged on the upper frame 1110 in a way that extends in an up-down direction, for example, in a way that protrudes in a direction opposite to the flow direction F of air. Accordingly, emitted ions may be diffused at a maximum level, and dust particles included in the air may be evenly electrified.

The discharge tip 1131 may electrically connect to the high voltage cable 1132 and may be supported by the high voltage tip body 1133.

The discharge tip 1131 may be physically fixed to the high voltage cable 1132 by a thermal contraction tube 1131'.

The discharge tip 1131 may include a plurality of discharge tips, and as illustrated, may include first to fifth discharge tips 1131*a*, 1131*b*, 1131*c*, 1131*d*, 1131*e*.

The high voltage tip body 1133 may be disposed between the upper frame 1110 and the lower frame 1140, and an upper portion of the high voltage tip body 1133 may be covered by the upper frame at least partially in a state in which the high voltage tip body 1133 is mounted onto the lower frame 1140.

Additionally, the high voltage tip body 1133 may be manufactured individually in addition to the discharge tip 1131 and the high voltage cable 1132 and coupled to the discharge tip 1131 and the high voltage cable 1132, or may be manufactured using an insert injection molding method in a state in which the discharge tip 1131 and the high voltage cable 1132 are disposed in a mold.

The high voltage tip body 1133 may be pressed and supported by one body and the other body in a state in which the discharge tip 1131 and the high voltage cable 1132 are at least partially inserted between one body and the other body, after one body and the other body are respectively injection-molded for the high voltage tip body.

A pair of upper hook parts 1133*a* and a pair of lower hook parts 1133*b*, which respectively have approximately the same shape and protrude, may be formed in an upper portion and a lower portion of the high voltage tip body 1133.

The pair of upper hook parts 1133*a* and the pair of lower hook parts 1133*b* may be respectively spaced a maximum distance apart from the discharge tip 1131 to prevent the pair of upper hook parts 1133*a* and the pair of lower hook parts 1133*b* from interfering with the discharge tip 1131.

For example, the upper hook part 1133*a* may include a first upper hook 1133*a*' and a second upper hook 1133*a*". The first upper hook 1133*a*' may be formed at one side end of the upper portion of the high voltage tip body 1133, and the second upper hook 1133*a*" may be formed at the other side end of the upper portion of the high voltage tip body 1133.

The lower hook part 1133*b* may be symmetrical to the upper hook part 1133*a*.

That is, the lower hook part 1133*b* may include a first lower hook 1133*b*' and a second lower hook 1133*b*". The first lower hook 1133*b*' may be formed at one side end of the lower portion of the high voltage tip body 1133, and the second lower hook 1133*b*" may be formed at the other side end of the lower portion of the high voltage tip body 1133.

The lower hook part 1133*b* may include the first lower hook 1133*b*' disposed at a rearmost end of the lower portion of the high voltage tip body 1133, and the second lower hook 1133*b*" disposed at a frontmost end of a lower of the high voltage tip body 1133.

The high voltage tip body may be manufactured using the insert injection molding method in a state in which the discharge tip and the high voltage cable are disposed in a mold.

The ground cable 1135 may be connected to a ground terminal 1136 by a ground connecting tip 1137.

The ground cable 1135, as illustrated in FIG. 13, may be supported by the lower frame 1140, and electrically connected to the ground terminal 1136 by the ground connecting tip 1137.

The ground connecting tip 1137 may connect to the ground terminal 1136, and the ground terminal 1136 may be inserted into and coupled to a ground pin mounting part 1122*c* formed on the second plate 1122.

The high voltage tip part 1130 may be configured as described above. Coupling structures between the high voltage tip part 1130 and the upper frame 1110 and between the high voltage tip part and the lower frame 1140 are described hereunder.

Specifically, a first upper high voltage tip body coupling part 1112*a*' and a second upper high voltage tip body coupling part 1112*a*" may be formed at the upper frame 1110 as illustrated in FIG. 12(*a*).

A discharge tip through hole part 1112*a*'1 and an upper hook coupling part 1112*a*'2 may be formed at the first upper high voltage tip body coupling part 1112*a*'.

The discharge tip through hole part 1112*a*' 1 may be used to expose the discharge tip 1131 of the high voltage tip part 1130 outward when the upper frame 1110 is coupled to the lower frame 1140 to cover the high voltage tip part 1130.

The upper hook coupling part 1112*a*'2 may be used for inserting and coupling the pair of upper hook parts 1133*a* of the high voltage tip body 1133 described above. To this end, the upper hook coupling part 1112*a*'2 may be formed into a through hole corresponding to the upper hook part 1133*a*.

The upper hook coupling part 1112*a*'2 may be formed on both sides of the discharge tip through hole part 1112*a*'1.

Additionally, as is the case with the above first upper high voltage tip body coupling part 1112*a*", a discharge tip through hole part 1112*a*"1 and an upper hook coupling part 1112*a*"2 may be respectively formed at the second upper high voltage tip body coupling part 1112*a*".

A first lower high voltage tip body coupling part 1141*b*' and a second lower high voltage tip body coupling part 1141*b*" may be formed at the lower frame 1140 as illustrated in FIG. 12(*b*).

A lower hook coupling part 1141*b*'1, 1141*b*"1 may be respectively formed at the first lower high voltage tip body coupling part 1141*b*' and the second lower high voltage tip body coupling part 1141*b*".

The lower hook coupling part 1141*b*'1, 1141*b*"1 may be used for inserting and coupling the pair of lower hook parts 1133*b* of the high voltage tip body 1133 described above. To this end, the lower hook coupling part 1141*b*'1, 1141*b*"1 may be formed into a through hole corresponding to the lower hook part 1133*b*.

Additionally, the high voltage cable 1132 may include first to fifth cables 1132*a*, (1132*a*, 1132*b*, 1132*c*, 1132*d*, 1132*e*, and may be configured to electrically connect to the high voltage supplier.

When the first to fifth cables are configured to individually connect to the high voltage supplier, a space for supporting and protecting the first to fifth cables (1132*a*, 1132*b*, 1132*c*, 1132*d*, 1132*e*) is additionally required, and a connection terminal needs to be individually installed in the high voltage supplier.

That is, the number or length of required cables may increase, and sizes of the upper frame 1110 and the lower frame 1140 that support and cover the first to fifth cables (1132*a*, (1132*a*, 1132*b*, 1132*c*, 1132*d*, 1132*e*) may increase.

To solve the problem, the electrification module 1100 according to the present disclosure may be provided with a cable holder 1134 for simplifying a connection structure of the first to fifth cables (1132*a*, 1132*a*, 1132*b*, 1132*c*, 1132*d*, 1132*e*).

The cable holder 1134 may have a cuboid shape having a left-right width greater than an up-down height and a front-rear thickness.

A cable connection structure that branches a main cable 1132', one end of which electrically connects to the above high voltage supplier, into the first to fifth cables 1132*a*, 1132*b*, 1132*c*, 1132*d*, 1132*e* may be buried into the cable holder 1134 having a cuboid shape.

That is, the cable holder 1134 may protect and maintain a branch point or a contact point between the main cable 1132' and the first to fifth cables 1132*a*, 1132*b*, 1132*c*, 1132*d*, 1132*e*.

The other end of the main cable 1132', one end of which electrically connects to the high voltage supplier, may pass through one lateral surface 1134*d* of the cable holder 1134 and extend into the cable holder 1134.

For example, the other end of the main cable 1132' may pass and extend through an upper side of one lateral surface 1134*d* of the cable holder 1134, as illustrated. Since a single main cable 1132' only electrically connects to the high voltage supplier, a configuration of a connecting part of the high voltage supplier may be simplified.

The other end of the main cable 1132' extended into the cable holder 1134 may be branched into the first to fifth cables 1132*a*, 1132*b*, 1132*c*, 1132*d*, 1132*e*.

Among the first to fifth cables, the first to third cables 1132*a*, 1132*b*, 1132*c* may pass through the other lateral surface 1134*c* of the cable holder 1134, protrude to the outside of the cable holder 1134, and respectively extend to first to third discharge tips 1131*a*, 1131*b*, 1131*c*.

The first to third cables 1132*a*, 1132*b*, 1132*c* supplying a voltage to the first to third discharge tips 1131*a*, 1131*b*, 1131*c*, arranged on one side with respect to the cable holder 1134, may be configured to pass and extend through the other lateral surface 1134*c* of the cable holder 1134.

The fourth and fifth cables 1132*d*, 1132*e* supplying a voltage to the fourth and fifth discharge tips 1131*d*, 1131*e*, arranged on one side of the cable holder 1134, may be configured to pass and extend through the lateral surface 1134*d* of the cable holder 1134.

In this case, to minimize the front-rear thickness of the cable holder 1134, positions at which the first to third cables 1132*a*, 1132*b*, 1132*c* protrude may be arranged next to each other in the up-down direction on the other lateral surface 1134*c* of the cable holder 1134, and positions at which the main cable 1132*c*', the fourth cable and the fifth cable 1132*d*, 1132*e* protrude may be arranged next to each other in the up-down direction on one lateral surface 1134*d* of the cable holder 1134.

With the above configuration, the same number of cables may be disposed respectively on the other lateral surface 1134*c* and one lateral surface 1134*d* of the cable holder 1134. Accordingly, a thickness of the front-rear and height of the cable holder 1134 may be minimized and optimized, and the up-down height of the electrification module 1100 may be minimized.

When the third to fifth discharge tips 1131*c*, 1131*d*, 1131*e* are disposed on the other side of the cable holder 1134 with respect to a connection direction of the main cable 1132', the third to fifth cables 1132*c*, 1132*d*, 1132*e* may be configured to connect through one lateral surface 1134*d* of the cable holder 1134, and the main cable 1132' and the first and second cables 1132*a*, 1132*b* may be configured to connect through the other lateral surface 1134*c* of the cable holder 1134.

The cable holder 1134 may be manufactured using the insert injection molding method in a state in which the main cable 1132' is branched into the first to fifth cables 1132*a*, 1132*b*, 1132*c*, 1132*d*, 1132*e*.

A well-known technology in the art to which the present disclosure pertains may be applied to the structure in which the main cable 1132' is branched into the first to fifth cables 1132*a*, 1132*b*, 1132*c*, 1132*d*, 1132*e* and is manufactured using the insert injection molding method. Accordingly, description in relation to this is omitted.

An upper surface 1134*a* and a lower surface 1134*b* of the cable holder 1134 may be accommodated in the upper frame 1110 and the lower frame 1140 in a state in which the upper surface 1134*a* and the lower surface 1134*b* respectively surface-contact the upper frame and the lower frame. In this case, to minimize a length of the main cable 1132', the cable holder 1134 may be disposed near the cover module 1200 in which the high voltage supplier is accommodated.

A fixing projection 1134*f* may be formed on the upper surface 1134*a* of the cable holder 1134 and protrude toward the upper frame 1110, and an inserting hole corresponding to the fixing projection 1134*f* may be formed at the upper frame 1110.

FIG. 9 shows an embodiment provided with a single cable holder 1134. However, as illustrated in FIG. 15, an embodiment may be configured to including a plurality of cable holders.

Figure 15:
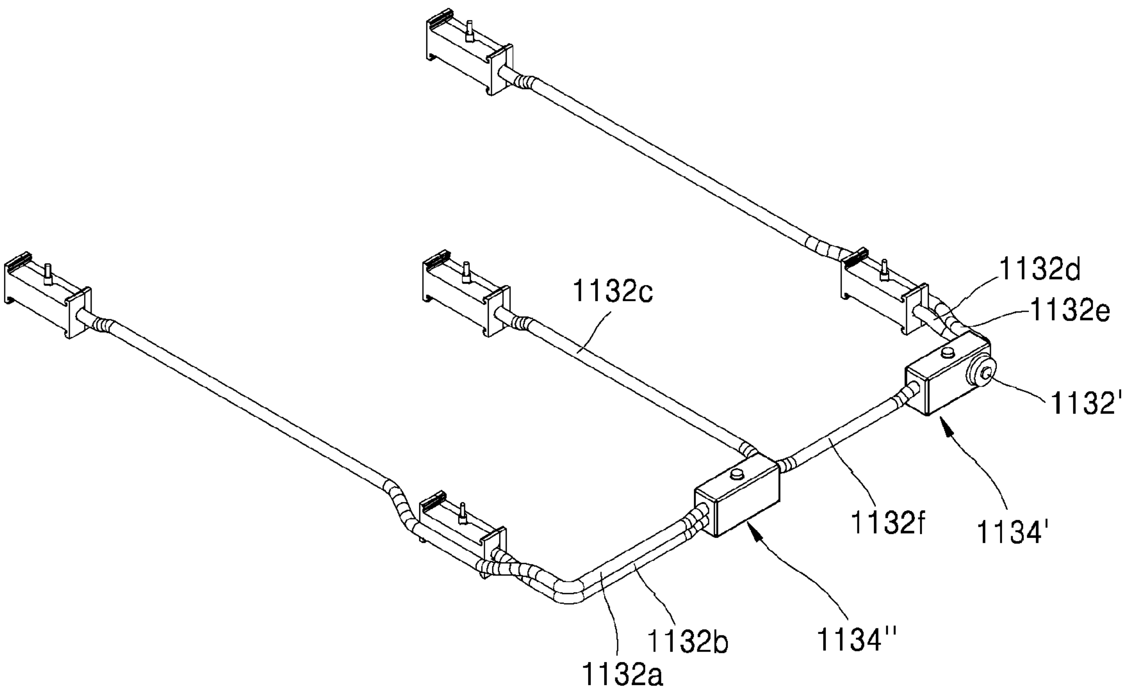
FIG. 15 is a block diagram schematically showing a high voltage tip part according to another embodiment.

As illustrated in FIG. 15, a first cable holder 1134' and a second cable holder 1134" may be provided, and the first cable holder and the second cable holder may be spaced apart from each other with the third discharge tip 1131*c* therebetween.

Like the cable holder 1134 illustrated in FIG. 9, a cable connection structure for branching a plurality of cables may be buried into each of the first cable holder 1134' and the second cable holder 1134".

Additionally, like the cable holder 1134 illustrated in FIG. 9, the first cable holder 1134' and the second cable holder 1134" may be configured to allow cables to connect through a lateral surface of each of the cable holders.

However, the first cable holder 1134' and the second cable holder 1134" may allow a smaller number of cables to connect through the lateral surfaces of the cable holders than the cable holder 1134 illustrated in FIG. 9.

Specifically, the main cable 1132' may connect to one lateral surface of the first cable holder 1134', preferably a front surface of the first cable holder.

The main cable 1132' may be branched in the first cable holder 1134', the fourth cable 1132*d* and the fifth cable 1132*e* may protrude next to each other in the up-down direction through one lateral surface of the first cable holder 1134', and an intermediate cable 1132*f* may protrude and extend through the other lateral surface of the first cable holder 1134'.

The intermediate cable 1132*f* extended from the other lateral surface of the first cable holder 1134' may pass through one lateral surface of the second cable holder 1134" and extend into the second cable holder 1134".

The intermediate cable 1132*f* extended into the second cable holder 1820 may be branched into the first to third cables 1132*a*, 1132*b*, 1132*c*.

As illustrated, among the branched cables, the first cable 1132*a* and the second cable 1132*b* may protrude and extend next to each other in the up-down direction from the other lateral surface of the second cable holder 1134", and the third cable 1132*c* may protrude and extend next to the intermediate cable 1132*f* in the up-down direction from the other lateral surface of the second cable holder 1134".

With the above configuration, the number of cables connected respectively to both lateral surfaces of the first cable holder 1134' and the second cable holder 1134" may be limited to 2 or less. Accordingly, a height of the first cable holder 1134' and the second cable holder 1134" may additionally decrease, and the up-down height of the electrification module 1100 may additionally decrease.

Figure 16:
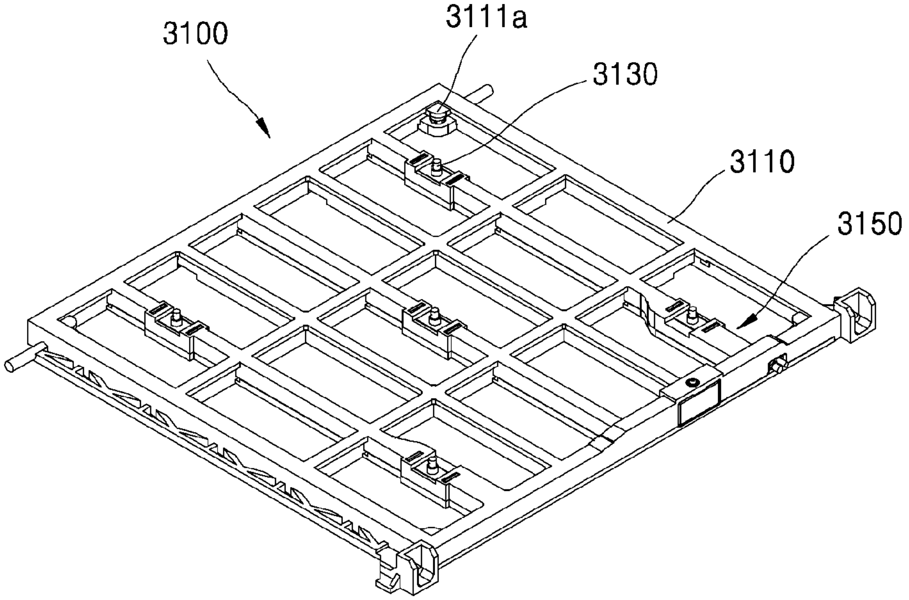
FIG. 16 is a block diagram schematically showing an electrification module according to another embodiment.
Figure 17:
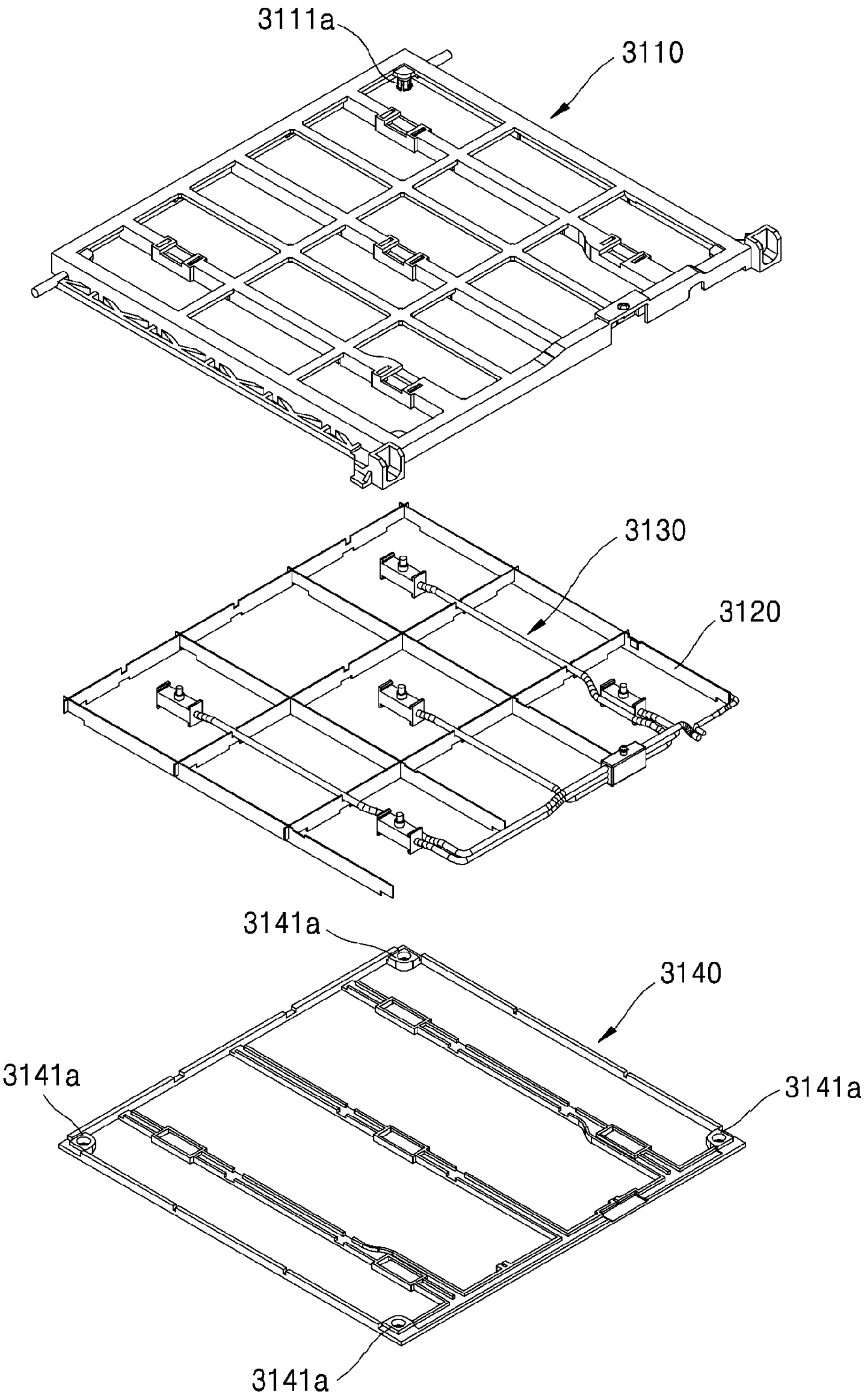
FIG. 17 is an exploded block diagram schematically showing the electrification module in FIG. 16 without an upper frame.
Figure 18:
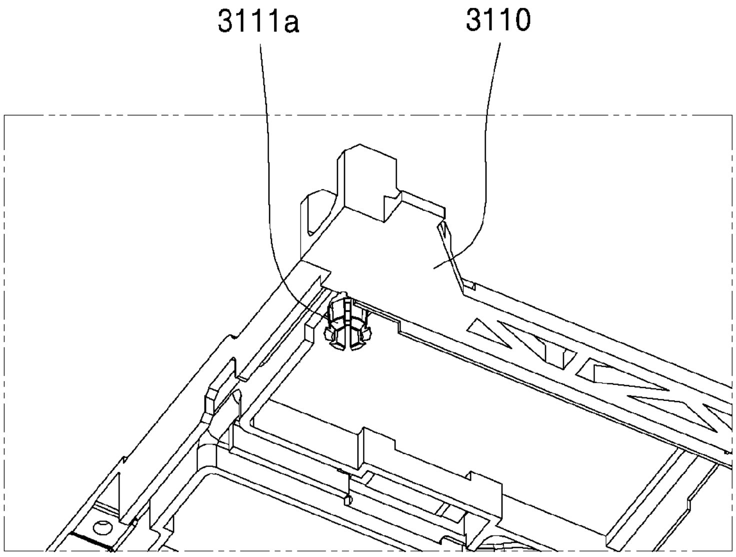
FIG. 18 is a partial block diagram schematically showing an upper frame in the electrification module in FIG. 17.

FIG. 16 is a block diagram schematically showing an electrification module according to another embodiment, FIG. 17 is an exploded block diagram schematically showing the electrification module in FIG. 16 without an upper frame, and FIG. 18 is a partial block diagram schematically showing an upper frame in the electrification module in FIG. 17. As illustrated, the electrification module according to the second embodiment differs from the electrification module according to the first embodiment only in a coupling structure between the upper frame and the lower frame.

Specifically, the electrification module 3100 according to the second embodiment may include an upper frame 3110, a conductive plate part 3120, a high voltage tip part 3130 and a lower frame 3140.

A plurality of coupling hooks 3111*a* for a detachable fixation and coupling to the lower frame 3140 may be formed at the upper frame 3110.

For example, the plurality of coupling hooks 3111*a* may be respectively arranged along a circumferential direction, and each of the coupling hooks 3111*a* may be disposed at four edges of the upper frame 3110.

A loop-shaped coupling ring 3141*a* into which each coupling hook 3111*a* is inserted and by which each coupling hook is held may be formed at the lower frame 3140.

Thus, the coupling hook 3111*a* may be inserted into and held by an inserting hole formed at the coupling ring 3141*a*.

The embodiments are described above with reference to a number of illustrative embodiments thereof. However, the present disclosure is not intended to limit the embodiments and drawings set forth herein, and numerous other modifications and embodiments can be devised by one skilled in the art without departing from the technical spirit of the disclosure. Further, the effects and predictable effects based on the configurations in the disclosure are to be included within the range of the disclosure though not explicitly described in the description of the embodiments.

What is claimed is:

1. An electrification apparatus for dust collection, the electrification apparatus comprising:
- an electrification module configured to generate ions that are emitted to air,
- wherein the electrification module comprises:
  - a high voltage tip comprising at least one discharge tip configured to emit the ions in a direction opposite to a flow direction of the air,
  - a conductive plate disposed around the discharge tip and configured to generate an electric potential difference with the discharge tip of the high voltage tip,
  - a lower frame that mounts the conductive plate and the high voltage tip, and
  - an upper frame that is coupled to the lower frame, the upper frame covering the conductive plate and the high voltage tip so that the discharge tip is exposed to outward,
- wherein the upper frame comprises (i) an upper outer frame that provides a lower frame coupling part for coupling to the lower frame and (ii) an upper inner frame disposed inside the upper outer frame, and
- wherein the lower frame provides a coupling hook corresponding to the lower frame coupling part.

2. The electrification apparatus of claim 1, wherein the upper inner frame comprises (i) a first upper inner frame covering the high voltage tip and (ii) a second upper inner frame covering the conductive plate, and
- wherein the second upper inner frame partitions an inner space of the upper outer frame into a plurality of electrification spaces.

3. The electrification apparatus of claim 2, wherein the first upper inner frame provides (i) a cross section having a lower end that is open and that has a “U” shape and (ii) a high voltage tip body coupling part coupled to a high voltage tip body of the high voltage tip.

4. The electrification apparatus of claim 3, wherein the high voltage tip body coupling part (i) defines an opening through which the discharge tip passes and (ii) provides a high voltage tip body upper coupling part coupled to the high voltage tip body.

5. The electrification apparatus of claim 4, wherein the high voltage tip body upper coupling part comprises a first upper high voltage tip body coupling part and a second upper high voltage tip body coupling part,
- wherein the first upper high voltage tip body coupling part is coupled to the high voltage tip body,
- wherein the second upper high voltage tip body coupling part is coupled to the high voltage tip body and simultaneously covers the high voltage tip body and a high voltage cable configured to supply a voltage to the discharge tip, and
- wherein the second upper high voltage tip body coupling part is disposed further forward than the first upper high voltage tip body coupling part with respect to an extension direction of the high voltage cable.

6. The electrification apparatus of claim 1, wherein the lower frame comprises:
- a lower outer frame providing the coupling hook,
- a cable mounting groove that is disposed inside the lower outer frame and that mounts a high voltage cable configured to supply a voltage to the discharge tip, and
- a lower inner frame providing a lower high voltage tip body mounting part that mounts a high voltage tip body of the high voltage tip.

7. The electrification apparatus of claim 6, wherein the lower high voltage tip body mounting part comprises a first lower high voltage tip body mounting part and a second lower high voltage tip body mounting part,
- wherein the high voltage tip body is mounted onto the first lower high voltage tip body mounting part,
- wherein the high voltage tip body and the high voltage cable are mounted onto the second lower high voltage tip body mounting part, and
- wherein the second lower high voltage tip body mounting part is disposed further forward than the first lower high voltage tip body mounting part with respect to an extension direction of the high voltage cable.

8. The electrification apparatus of claim 1, wherein the conductive plate comprises a plurality of first plates and a plurality of second plates, and
- wherein the first plate and the second plate are disposed to cross each other in an orthogonal direction.

9. The electrification apparatus of claim 8, wherein each of the plurality of first plates provides a cable mounting part, a second plate inserting part, and an end coupling part,
- wherein a high voltage cable of the high voltage tip is mounted onto the cable mounting part,
- wherein the second plate inserting part is a slit that is defined at a first end surface of the first plate, and
- wherein the end coupling part is (i) provided at both lateral ends of the first plate and (ii) a slit that is defined at the first end surface of the first plate to allow a corresponding second plate of the plurality of second plates to be inserted into and coupled to the first plate.

10. The electrification apparatus of claim 8, wherein each of the plurality of second plates provides a first plate inserting part, an end coupling part, and a ground pin mounting part,
- wherein the first plate inserting part is a slit that is defined at a first end surface of the second plate,
- wherein the end coupling part is (i) provided at both lateral ends of the second plate and (ii) a slit that is defined at the first end surface of the second plate, and
- wherein the ground pin mounting part is coupled to a ground pin that is connected to a ground cable configured to ground the conductive plate.

11. The electrification apparatus of claim 8, wherein the high voltage tip further comprises:
- a high voltage cable electrically connected to the discharge tip,
- a high voltage tip body supporting the discharge tip, a cable holder supporting the high voltage cable,
a ground terminal connected to the conductive plate, and
a ground cable connected to the ground terminal.

12. The electrification apparatus of claim 11, wherein the high voltage tip body provides (i) an upper hook part protruding upward at an upper portion of the high voltage tip body and (ii) a lower hook part protruding downward at a lower portion of the high voltage tip body, wherein an upper high voltage tip body coupling part corresponding to the upper hook part is provided at the upper frame, and wherein a lower high voltage tip body coupling part corresponding to the lower hook part is provided at the lower frame.

13. The electrification apparatus of claim 12, wherein the upper frame defines a discharge tip through hole so that the discharge tip is exposed to outward, and wherein the upper hook coupling part is provided at first and second sides of the discharge tip through hole.

14. The electrification apparatus of claim 12, wherein the upper hook part comprises (i) a first upper hook provided at a first side end of the upper portion of the high voltage tip body and (ii) a second upper hook provided at a second side end of the upper portion of the high voltage tip body.

15. The electrification apparatus of claim 12, wherein the lower hook part comprises (i) a first lower hook provided at a first side end of the lower portion of the high voltage tip body and (ii) a second lower hook provided at a second side end of the lower portion of the high voltage tip body.

16. The electrification apparatus of claim 11, wherein the high voltage cable further comprises a single main cable having a first end electrically connected to a voltage supplier that is configured to generate a voltage supplied to the electrification module.

17. The electrification apparatus of claim 11, wherein the discharge tip comprises a first discharge tip, a second discharge tip, a third discharge tip, a fourth discharge tip, and a fifth discharge tip that are spaced apart from each other, wherein the high voltage cable comprises a first cable electrically connected to the first discharge tip, a second cable electrically connected to the second discharge tip, a third cable electrically connected to the third discharge tip, a fourth cable electrically connected to the fourth discharge tip, and a fifth cable electrically connected to the fifth discharge tip, and wherein each of the first cable, the second cable, the third cable, the fourth cable, and the fifth cable is branched from a main cable electrically connected to a voltage supplier.

18. The electrification apparatus of claim 17, further comprising a cable holder that includes a branch point of the first cable, the second cable, the third cable, the fourth cable and the fifth cable branched from the main cable.

19. The electrification apparatus of claim 18, further comprising a cover module that provides a voltage supplier to which the main cable is connected.

* * * * *